UNITED STATES PATENT OFFICE.

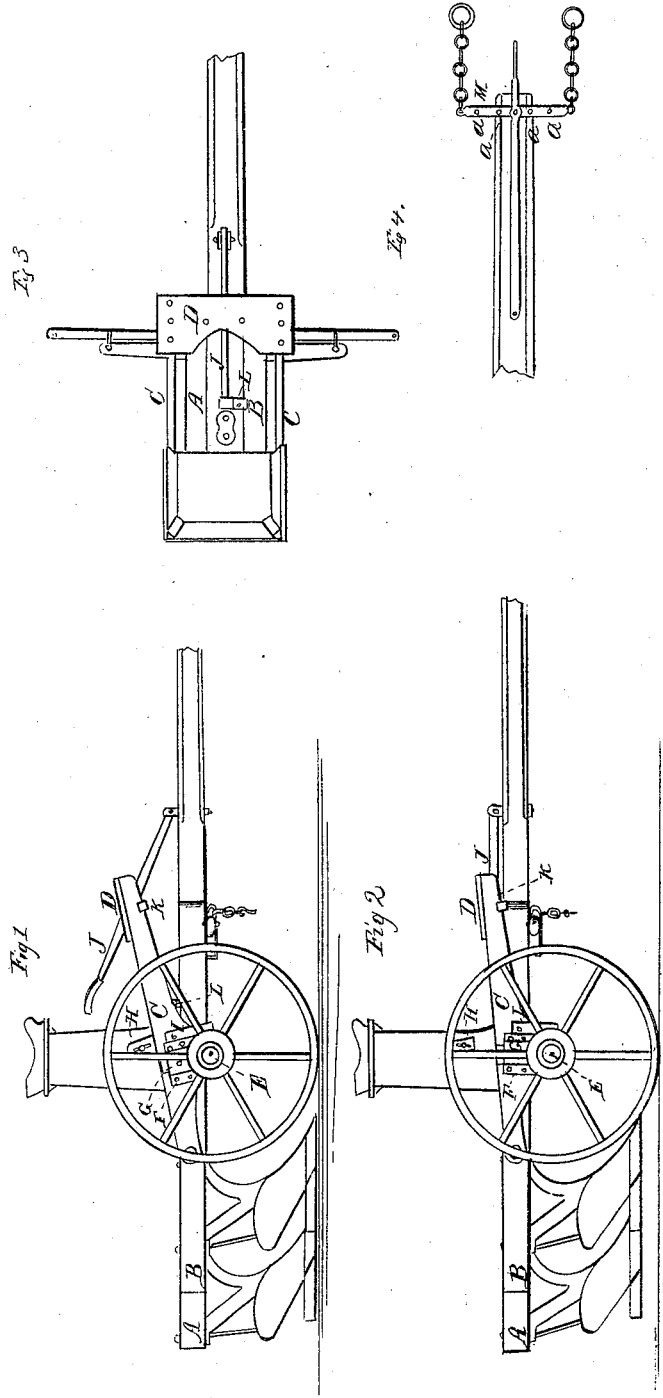

LABAN HOLLOWAY, OF SAN FRANCISCO, CALIFORNIA.

IMPROVEMENT IN GANG-PLOWS.

Specification forming part of Letters Patent No. 92,968, dated July 27, 1869.

*To all whom it may concern:*

Be it known that I, LABAN HOLLOWAY, of San Francisco, in the county of San Francisco and State of California, have invented certain new and useful Improvements in Gang-Plows; and I do hereby declare that the following is a full and exact description of the same, reference being had to the accompanying drawings, and to the letters of reference marked thereon.

My invention consists in so constructing a gang-plow that the plows can be raised and lowered by the weight of the driver by placing his feet on a treadle and foot-board that is connected to the driving-wheels and pole. At the same time the machine is so simple in its construction that it can be afforded at a much less price than that of the ordinary plows now in use. My plow will also accomplish all that can reasonably be expected of a gang-plow, while it can be easily managed both in and out of the ground or field.

Referring to the drawings, Figure 1 is a side elevation with the plow lowered. Fig. 2 is also a side elevation with the plow raised. Fig. 3 is a plan of the driver's box and forward portion of the machine. Fig. 4 is a bottom view of the end of the pole and my improved yoke.

A and B represent two parallel beams, between which the pole is placed, where it is rigidly held by transverse bolts passing through it and the beams.

To each side of the machine are attached arms C C, which are pivoted to the beams, being separated from them by short plates which form shoulders for the driver's box. These arms extend in front of the driver's box and have a cross-piece, D, as a resting-place for the driver's feet.

The wheels of my plow are of the ordinary kind, yet the axle does not extend across the frame; but each wheel has an independent axle, E, with the inner end bent at right angles to form a crank, which is held by a band, F, attached to the movable arms at the sides of the frame. This admits of the wheel being raised or lowered, so that the depth of the furrow may be regulated, while the land-wheel may be raised and the furrow-wheel lowered so that the plows may all run in a horizontal plane. The cranks or arms are held and regulated by set-screws G.

To the sides of the driver's seat are attached stops H, having a slit or groove to admit of them being set to hold the movable arms according to the intended depth of the plows after the crank-axles have been set. A strap, I, bent at right angles, passes beneath the frame, both ends of which are attached to the movable arm, and when the arms are raised the bottom of the frame rests upon it as a support.

To the pole is attached a treadle, J, which extends back to near the driver, passing under the foot-board at the end of the arms through a strap or band, K, and when the pressure is applied this treadle-bar is borne down to the pole, where it is held by a catch, L, and the plows are held firmly to their work, and all upward or downward movements of the frame are prevented until by the foot of the driver the treadle-lever is removed from the catch. For a more easy working of the treadle-lever, a friction-roller may be attached underneath the foot-board, against which it may work. The end of the pole is provided with a yoke, M, having holes $a\ a\ a$, through which a pin passes. By this means the machine may be turned to or from land from the end of the pole by moving the yoke from the center right or left.

Having thus described my invention, what I claim, and desire to secure by Letters Patent, is—

1. The movable arms C C, pivoted to the sides of the frame, and the treadle-lever J, attached to the pole, so that by their simultaneous movements the plow-frame can be raised and lowered, substantially as described.

2. The slotted stops H at each side of the driver's seat and the strap or bar L beneath the frame, substantially as and for the purposes set forth.

In witness whereof I have hereunto set my hand and seal.

LABAN HOLLOWAY. [L. S.]

Witnesses:
 C. W. M. SMITH,
 H. S. TIBBEY.